United States Patent
Miao et al.

(10) Patent No.: US 10,403,235 B2
(45) Date of Patent: Sep. 3, 2019

(54) METHODS FOR SCREEN-SHARING AND APPARATUSES USING THE SAME

(71) Applicant: Wistron Corp., New Taipei (TW)

(72) Inventors: Pen-Tai Miao, New Taipei (TW); Ping-Hung Chen, New Taipei (TW); Yu-Ping Lin, New Taipei (TW); Fang-Wen Liao, New Taipei (TW)

(73) Assignee: WISTRON CORP., New Taipei (TW)

( * ) Notice: Subject to any disclaimer, the term of this patent is extended or adjusted under 35 U.S.C. 154(b) by 790 days.

(21) Appl. No.: 14/593,169

(22) Filed: Jan. 9, 2015

(65) Prior Publication Data

US 2015/0373066 A1    Dec. 24, 2015

(30) Foreign Application Priority Data

Jun. 23, 2014 (TW) .............................. 103121509 A

(51) Int. Cl.
| | |
|---|---|
| H04L 29/06 | (2006.01) |
| G06F 3/0484 | (2013.01) |
| G06F 3/0482 | (2013.01) |
| G09G 5/14 | (2006.01) |
| G06F 3/14 | (2006.01) |

(52) U.S. Cl.
CPC .............. G09G 5/14 (2013.01); G06F 3/1454 (2013.01)

(58) Field of Classification Search
CPC ... H04L 65/403; G06F 3/0482; G06F 3/04842
See application file for complete search history.

(56) References Cited

U.S. PATENT DOCUMENTS

| 5,564,002 A * | 10/1996 | Brown ............... G09G 5/14 715/778 |
| 9,392,315 B1 * | 7/2016 | Lang .............. H04N 21/4122 |
| 2010/0257450 A1 * | 10/2010 | Go ................. G06F 3/0481 715/733 |
| 2012/0054640 A1 * | 3/2012 | Nancke-Krogh ..... G06F 9/4843 715/751 |
| 2012/0066378 A1 * | 3/2012 | Lui ................. G06F 11/3636 709/224 |

(Continued)

FOREIGN PATENT DOCUMENTS

| CN | 101795240 A | 8/2010 |
| CN | 103701927 A | 4/2014 |

(Continued)

OTHER PUBLICATIONS

Chinese language office action dated Dec. 10, 2015, issued in application No. TW 103121509.

(Continued)

*Primary Examiner* — Umut Onat
(74) *Attorney, Agent, or Firm* — McClure, Qualey & Rodack, LLP

(57) ABSTRACT

The invention introduces a screen-sharing method, executed by a processing unit of a screen-sharing source, which contains at least the following steps. Application windows being opened on a display unit are obtained. For each application window, screen-sharing receivers, which are connected to the screen-sharing source, are detected and items are appended to a system menu instance of the application window, where each item corresponds to one screen-sharing receiver.

16 Claims, 12 Drawing Sheets

(56) References Cited

U.S. PATENT DOCUMENTS

2013/0290863 A1    10/2013  Chen et al.
2014/0215358 A1*   7/2014   Uratani .................. G06F 3/048
                                                    715/753
2015/0200979 A1*   7/2015   Huang .................. G06F 3/0483
                                                    715/753

FOREIGN PATENT DOCUMENTS

EP      2 905 945 A1    8/2015
TW      201244424       11/2012

OTHER PUBLICATIONS

English language translation of relevant paragraphs of office action.
Chinese language office action dated Sep. 15, 2015, issued in application No. TW 103121509.
Chinese language office action dated Nov. 3, 2017, issued in application No. CN 201410304923.6.

* cited by examiner

METHODS FOR SCREEN-SHARING AND APPARATUSES USING THE SAME

CROSS REFERENCE TO RELATED APPLICATIONS

This application claims priority of Taiwan Patent Application No. 103121509, filed on Jun. 23, 2014, the entirety of which is incorporated by reference herein.

BACKGROUND

Technical Field

The present invention relates to a screencasting, and in particular to methods for sharing screens and apparatuses using the same.

Description of the Related Art

Screen-sharing technology enables to delivery of screen images to or from desktop computers, tablet computers, mobile phones, and other devices by wired or wireless way. It allows users to, for example, duplicate display from a desktop computer onto two or more mobile phones. Typically, plurality of mobile phones only display the whole screen image of the desktop computer but not different window images corresponding to different applications running on the desktop computer. Thus, it is desirable to have methods for screen-sharing and apparatuses using the same to address the aforementioned drawbacks.

BRIEF SUMMARY

An embodiment of the invention introduces a screen-sharing method, executed by a processing unit of a screen-sharing source, which contains at least the following steps. Application windows being opened on a display unit are obtained. For each application window, screen-sharing receivers, which are connected to the screen-sharing source, are detected and items are appended to a system menu instance of the application window, where each item corresponds to one screen-sharing receiver.

An embodiment of the invention introduces another screen-sharing method, executed by a processing unit of a screen-sharing source, which contains at least the following steps. Mappings between application windows and screen-sharing receivers connecting to the screen-sharing source are provided. A window image of each application window is sent to one designated screen-sharing receiver according to the mappings.

An embodiment of the invention introduces a screen-sharing apparatus, operating as a screen-sharing source, which contains at least a display unit and a processing unit. The processing unit, coupled to the display unit, obtains application windows being opened on the display unit; and, for each application window, detects screen-sharing receivers, which are connected to the screen-sharing source, and appends items to a system menu instance of the application window, where each item corresponds to one screen-sharing receiver.

An embodiment of the invention introduces another screen-sharing apparatus, operating as a screen-sharing source, which contains at least a display unit and a processing unit. The processing unit, coupled to the display unit, provides mappings between application windows and screen-sharing receivers connecting to the screen-sharing source; and sends a window image of each application window to one designated screen-sharing receiver according to the mappings.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
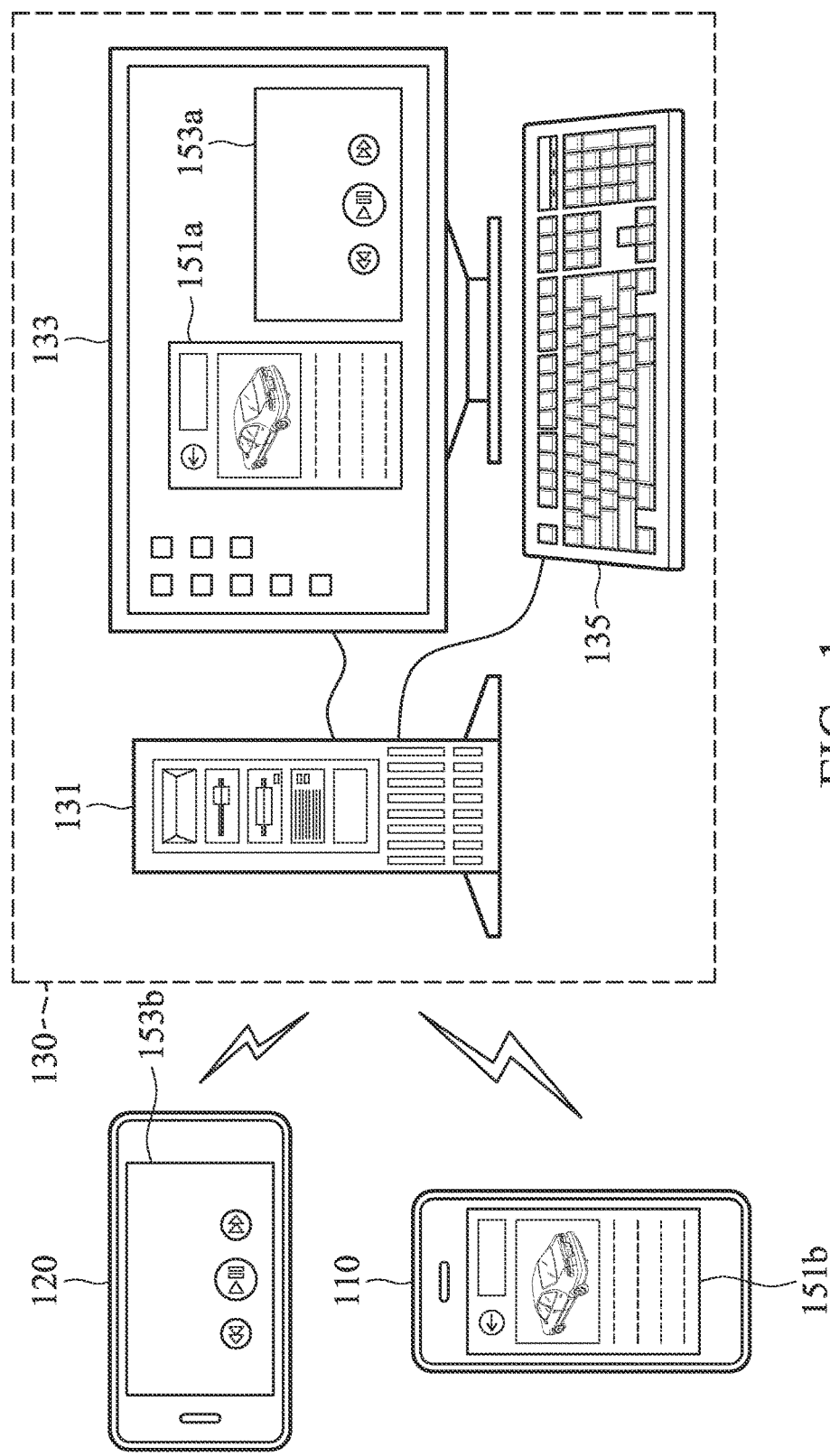
FIG. 1 illustrates the system architecture of the screen-sharing environment according to an embodiment of the invention.

Embodiments of the invention are operated in the screen-sharing system. FIG. 1 illustrates the system architecture of the screen-sharing environment according to an embodiment of the invention, containing mobile phones 110 and 120 and a desktop computer 130. The desktop computer may contain a host unit 131, a display device 133 and a keyboard 135. Either the mobile phone 110, 120 or the display device 133 includes a display panel, such as a TFT-LCD (Thin film transistor liquid-crystal display) panel, or an OLED (Organic Light-Emitting Diode) panel, to display input letters, alphanumeric characters and symbols, dragged paths, drawings, or screens provided by an application for the user to view. The mobile phones 110 and 120 may employ a wireless communications technology, such as Wi-Fi Connect®, Bluetooth®, etc., to connect to the desktop computer 130. The desktop computer 130 running on a multi-tasking OS (Operating System) may execute several applications at the same time, such as a browser, a mail management client, a multimedia player, a word processing program, etc. The desktop computer 130 may use a screencasting technology, such as the Miracast®, etc., to duplicate a browser window 151*a* onto a display unit 151*b* of the mobile phone 110, and a multimedia player window 153*a* onto a display unit 153*b* of the mobile phone 120. The mobile phones 110 and 120 may be referred to as screen-sharing receivers while the desktop computer 130 may be referred to as a screen-sharing source. Although a screen-sharing receiver is shown in the embodiments as the mobile phone 110 or 120, it should be understood that alternative embodiments are contemplated, such as providing a portable device like a tablet computer, a notebook computer, etc., as a screen-sharing receiver. Although a screen-sharing source is shown in the embodiments as the desktop computer 130, it should be understood that alternative embodiments are contemplated, such as providing a computer apparatus with a larger display, like a tablet computer, a notebook computer, etc., as a screen-sharing source. The connection between the screen-sharing source and receiver is not limited to wireless communications, it is also feasible to connect therebetween with wired cables, and the invention should not be limited thereto.

Figure 2:
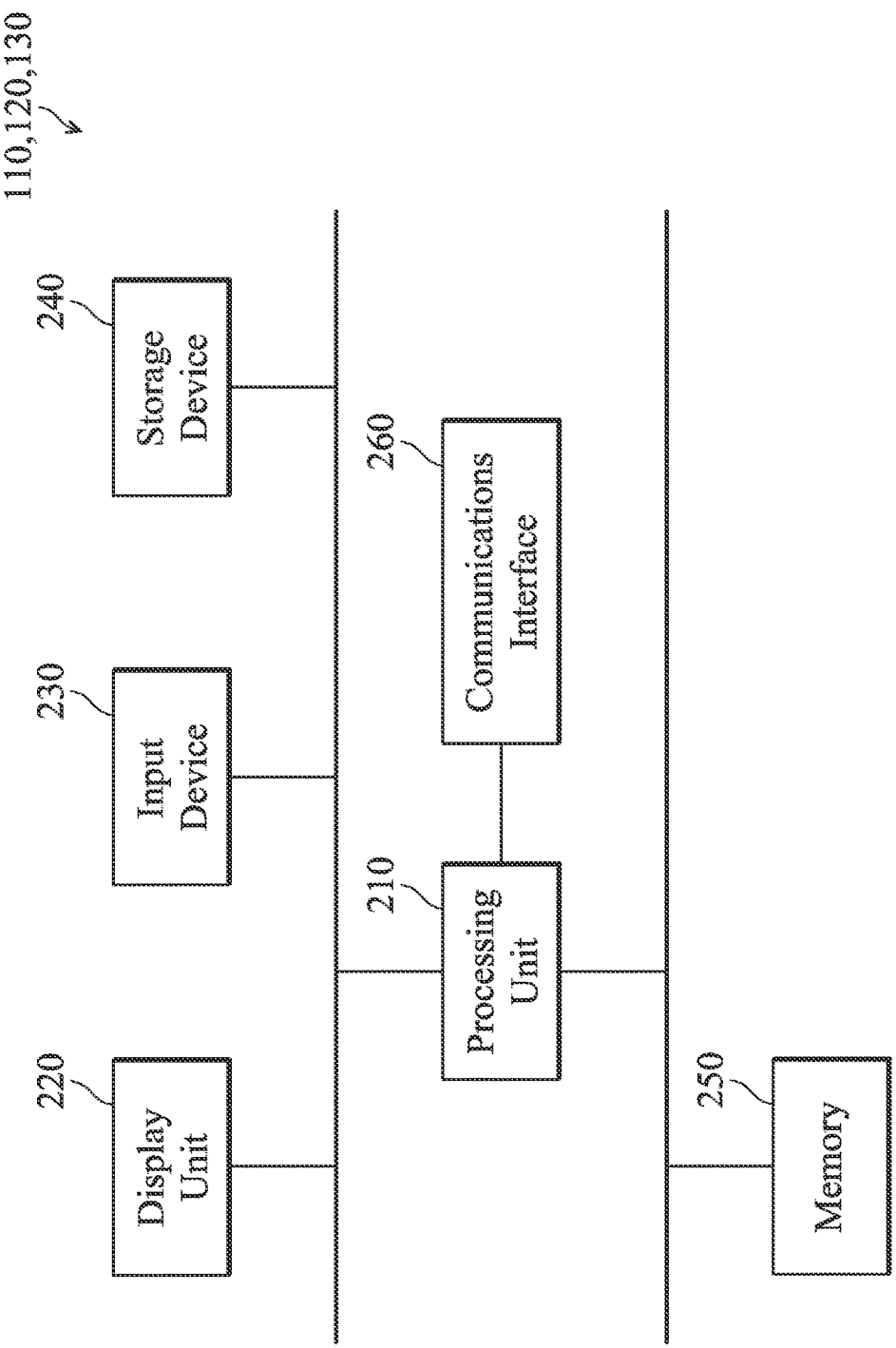
FIG. 2 is the system architecture of an electronic device according to an embodiment of the invention.

FIG. 2 is the system architecture of an electronic device according to an embodiment of the invention. The system architecture may be practiced in the mobile phone 110, 120, the desktop computer 130 or another electronic device with computation capability. A processing unit 210 can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein. The system architecture further includes a memory 250 for storing necessary data in execution, such as variables, data tables, etc., and a storage unit 240 for storing a wide range of electronic files, such as Web pages, documents, video files, audio files, etc. A communications interface 260 is included in the system architecture and the processing unit 210 can thereby communicate with another electronic device. An input device 230 may include a touch panel to help a user to make a gesture to control a running application. The gestures include, but are not limited to, a single-click, a double-click, a single-finger drag, and a multiple finger drag. The input device 230 may further include a keyboard, a keypad, a mouse, etc. A display unit 220 may include a display panel, such as a TFT-LCD (Thin film transistor liquid-crystal display) panel or an OLED (Organic Light-Emitting Diode) panel, to display input letters, alphanumeric characters, symbols, dragged paths, drawings, or screens provided by an application for the user to view.

Figure 3:
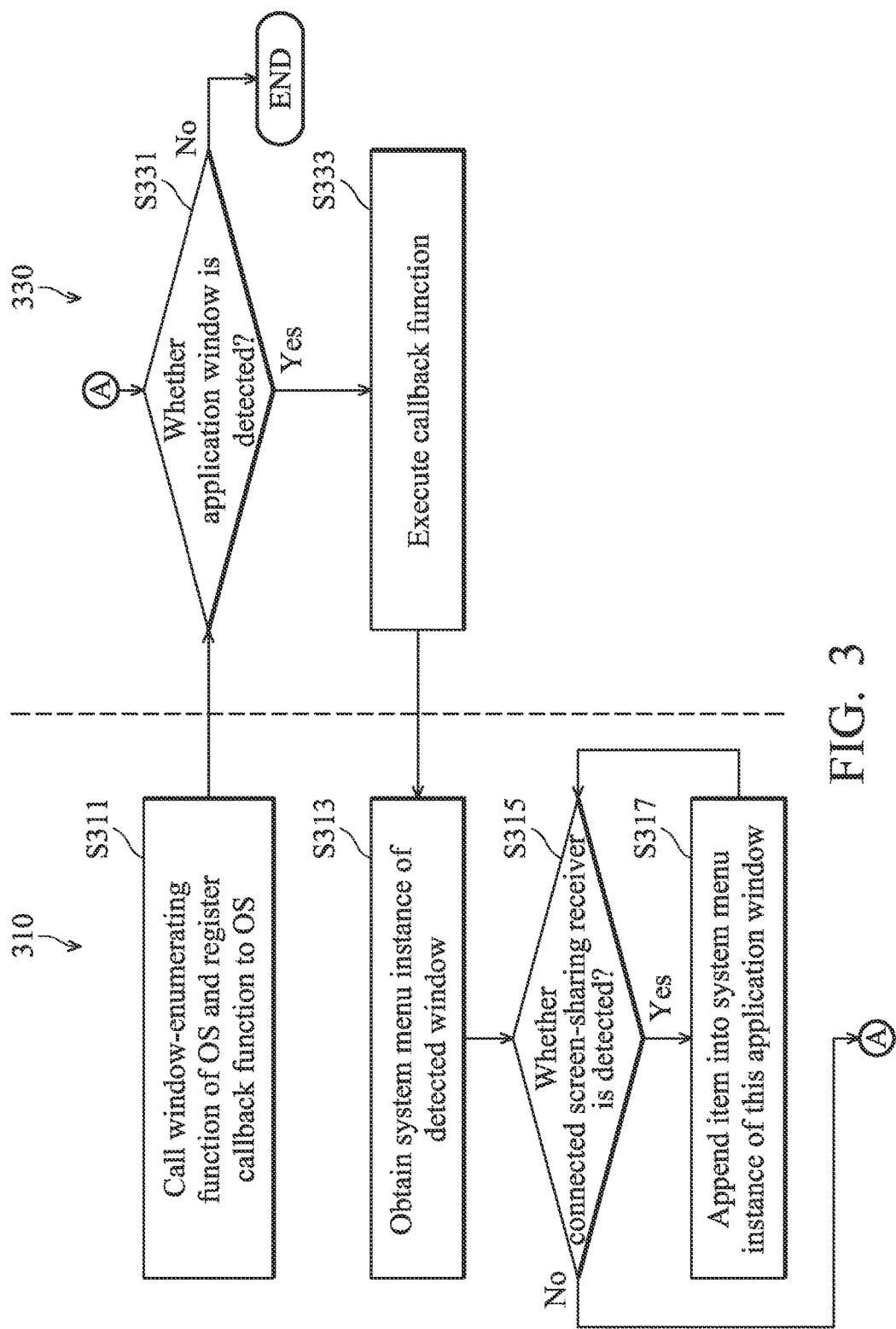
FIG. 3 is a flowchart illustrating a method for generating a system menu dynamically, performed by a processing unit of a desktop computer, according to an embodiment of the invention.

In order to share each application with one of the connected screen-sharing receivers, which is determined by a user, an embodiment of the invention introduces a method for detecting connected screen-sharing receivers in real-time and customizing application menus dynamically. The customized menu includes several items to help a user to determine to which screen-sharing receiver this application screen is intended to be shared with. FIG. 3 is a flowchart illustrating a method for dynamically generating a system menu, performed by the processing unit 210 of the desktop computer 130, according to an embodiment of the invention. The method is practiced in an application framework 310 and an OS 330. The OS 330 may be Microsoft® Windows or another OS, which can be run on the desktop computer 130. The processing unit 210 calls the window-enumerating function of the OS 330, and registers a callback function to the OS 330 when executing a system program thread for activating the screen-sharing function (step S311). The processing unit 210 determines whether an application window is detected when executing a thread of the window-enumerating function (step S331). If so, the callback function registered by the system program for activating the screen-sharing function is executed (step S333); otherwise, the whole process ends. In step S311, the system program for activating the screen-sharing function may use an API (Application Program Interface) of the "EnumWindows" and provide the callback function through the parameters. The processing unit 210 obtains a system menu instance of the detected application window (step S313) and repeatedly performs a detection loop until no screen-sharing receiver is detected (steps S315 to S317) when executing the callback function. The system menu instance includes several predefined items and each item is predefined by an identify code. The example of identify codes are predefined as below:

define SC_SIZE 0xF000
define SC_MOVE 0xF010
define SC_MINIMIZE 0xF020
define SC_MAXIMIZE 0xF030

In the detection loop, the processing unit 210 determines whether a connected screen-sharing receiver is detected (step S315). If so, the processing unit 210 appends an item of this application window into the system menu instance to help a user to share this application window to the detected screen-sharing receiver (step S317) and continues the next run of detection; otherwise, the callback function ends. It should be noted that, when the callback function ends, the processing unit 210 returns to execute the thread of the window-enumerating function, that is, goes back to step S311 to attempt to enumerate the next window. In step S317, the callback function needs to select one of the preserved identify codes for the new item, which corresponds to the detected screen-sharing receiver, and provides a display string. In other words, the same identify code is assigned to the appended items of different enumerated windows when the appended items are used to share different application windows to the same screen-sharing receiver. The reserved identify codes are designed not to be filtered by the OS 330. The example of identify codes are preserved for the novel screen-sharing function as below:

define MIRACAST_MENUITEM_ID_0 0xFF00
define MIRACAST_MENUITEM_ID_1 0xFF10
define MIRACAST_MENUITEM_ID_2 0xFF20
define MIRACAST_MENUITEM_ID_3 0xFF30
define MIRACAST_MENUITEM_ID_4 0xFF40
define MIRACAST_MENUITEM_ID_5 0xFF50
define MIRACAST_MENUITEM_ID_6 0xFF60

```
#define MIRACAST_MENUITEM_ID_7 0xFF70
#define MIRACAST_MENUITEM_ID_8 0xFF80
#define MIRACAST_MENUITEM_ID_9 0xFF90
```

Figure 4A:
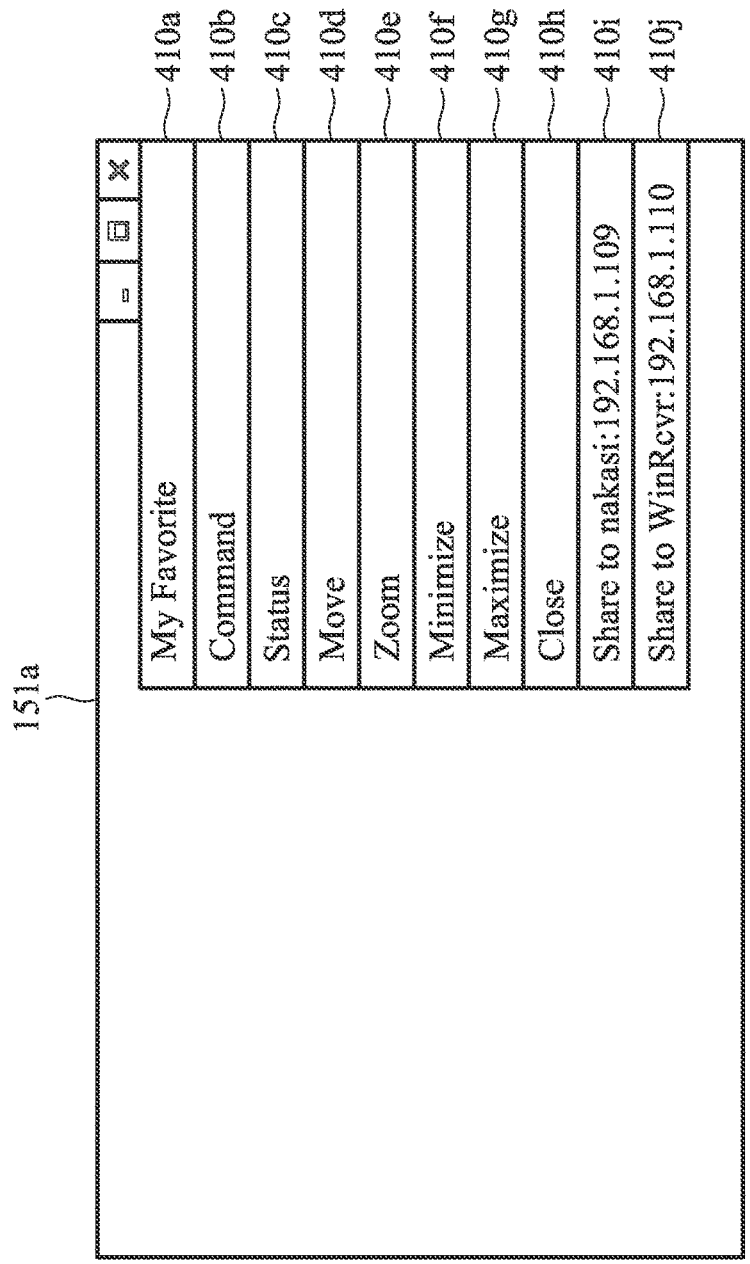
FIG. 4A is a schematic diagram of a system menu of a browser.
Figure 4B:
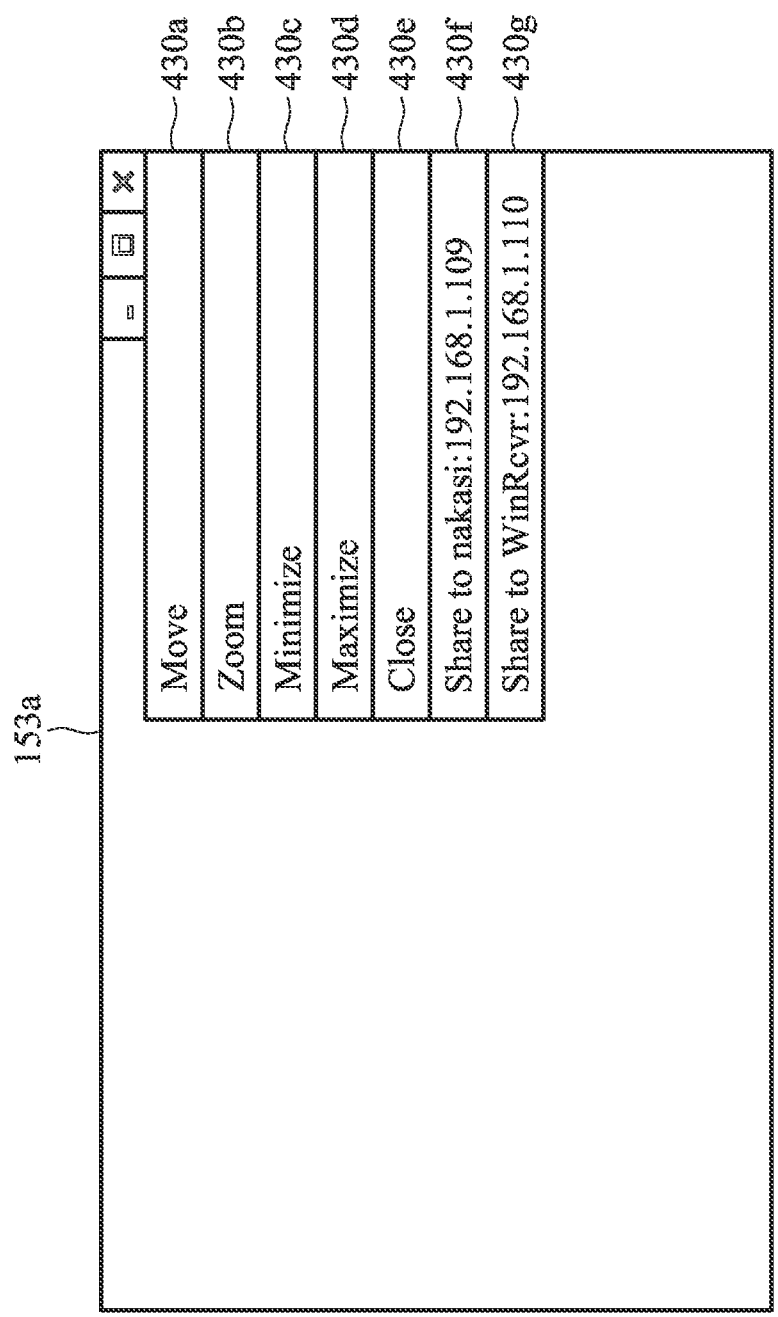
FIG. 4B is a schematic diagram of a system menu of a multimedia player.

The following depicts two applications as examples to deliberate the method for generating a system menu dynamically as shown in FIG. 3. FIG. 4A is a schematic diagram of a system menu of a browser. After detecting that a browser window has been opened (step S331), the window-enumerating function of the OS 330 executes the registered callback function (step S333). With the callback function being executed, the processing unit 210 obtains a system menu instance of a browser window 151a, which includes pre-defined menus 410a to 410h. Subsequently, after detecting that the mobile phone 110 has connected to the desktop computer 130 (the "yes" path of step S315), the processing unit 210 appends an item 410i into the system menu instance of the browser window 151a (step S317), where the identify code of the item 410i is "0xFF00" and the display string of the item 410i is "share to nakasi:192.168.1.109". After detecting that the mobile phone 120 has connected to the desktop computer 130 (the "yes" path of step S315), the processing unit 210 appends an item 410j into the system menu instance of the browser window 151a (step S317), where the identify code of the item 410j is "0xFF10" and the display string of the item 410i is "share to WinRcvr: 192.168.1.110". FIG. 4B is a schematic diagram of a system menu of a multimedia player. After detecting that a multimedia player window has been opened (step S331), the window-enumerating function of the OS 330 executes the registered callback function (step S333). With the callback function being executed, the processing unit 210 obtains a system menu instance of a multimedia player window 153a, which includes predefined menus 430a to 430e. Subsequently, after detecting that the mobile phone 110 has connected to the desktop computer 130 (the "yes" path of step S315), the processing unit 210 appends an item 430f into the system menu instance of the multimedia player window 153a (step S317), where the identify code of the item 430f is "0xFF00" and the display string of the item 430f is "share to nakasi:192.168.1.109", which are the same as that of the item 410i. After detecting that the mobile phone 120 has connected to the desktop computer 130 (the "yes" path of step S315), the processing unit 210 appends an item 430g into the system menu instance of the multimedia player window 153a (step S317), where the identify code of the item 430g is "0xFF10" and the display string of the item 430g is "share to WinRcvr:192.168.1.110", which are the same as that of the item 410j. After the user clicks any of the items 410a to 410j, the browser sends a message with a corresponding identify code to the OS 330. After the user clicks any of the items 430a to 430g, the multimedia player sends a message with a corresponding identify code to the OS 330.

Figure 5:
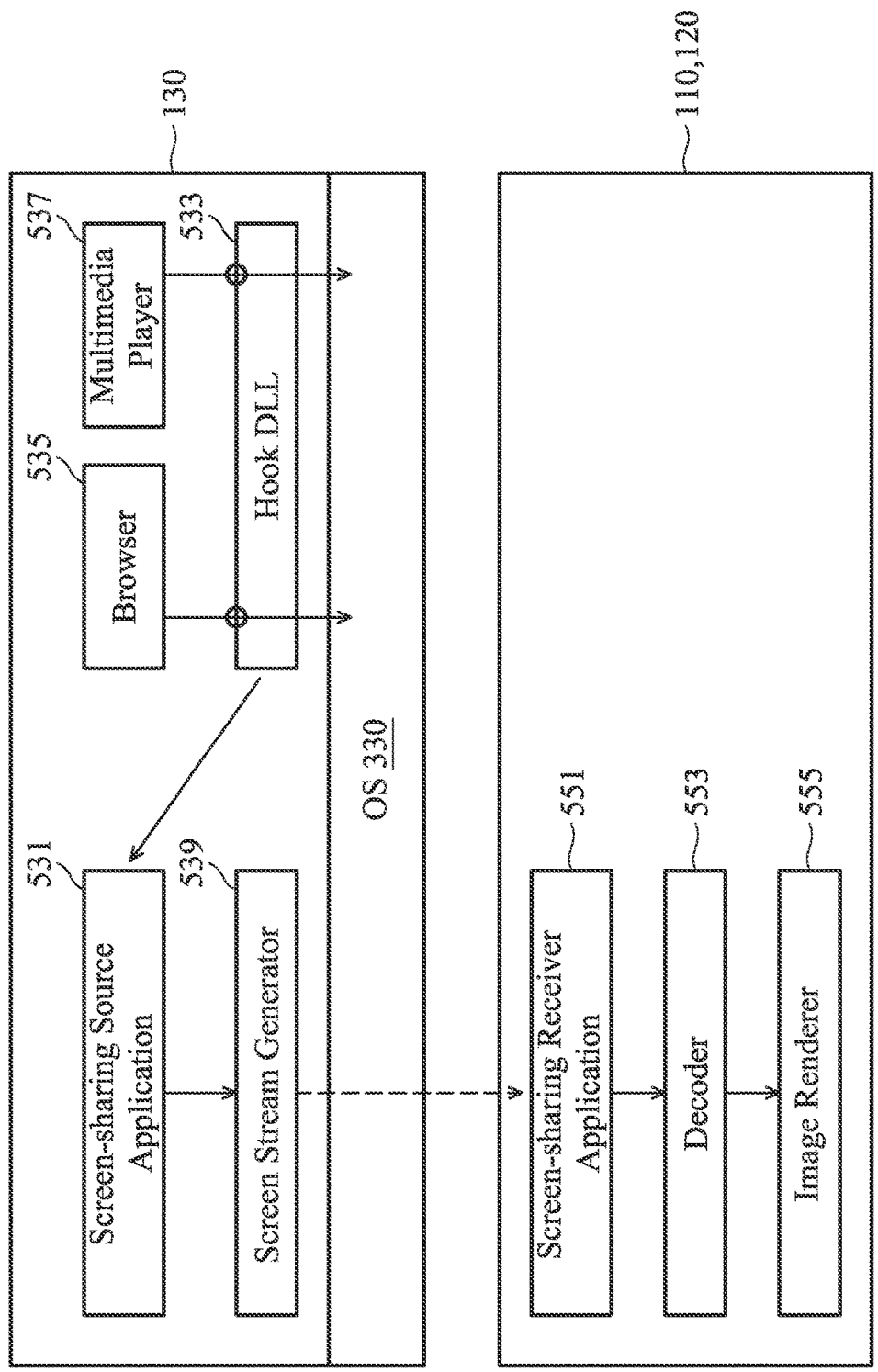
FIG. 5 is the software architecture practiced in a desktop computer and a mobile phone according to an embodiment of the invention.

FIG. 5 is the software architecture practiced in a desktop computer and a mobile phone according to an embodiment of the invention. A screen-sharing source application 531 and a hook DLL (Dynamic Link Library) 533 registers an HCBT (Hook Computer-Based Training) window event to the OS 330, thereby enabling the hook DLL 533 to intercept window events triggered by the browser 535 and the multimedia player 537, such as clicking an item in a system menu, minimizing this window, restoring this window, moving this window, etc. The hook DLL 533 is a global DLL capable of intercepting window events triggered by all applications. Exemplary code of the screen-sharing source application 531 and the hook DLL 533 for defining window event messages needed to be monitored can be seen as follows:

```
#define MIRAHOOK_WM_MENUITEM_MSG
    _T("MIRAHOOK_WM_MENUITEM_MSG-246F56AF-
D7EA-41d8-A1F6-2BC8515EB68B")
#define MIRAHOOK_WM_MIN_MSG
    _T("MIRAHOOK_WM_MIN_MSG-85E7A2BE-A24D-47b8-
B9A9-E12C4C8AD72E")
#define MIRAHOOK_WM_RESTORE_MSG
    _T("MIRAHOOK_WM_RESTORE_MSG-671EDE78-B997-
4c6f-AF90-BD0B2E54CC81")
#define MIRAHOOK_HCBT_MOVESIZE_MSG
    _T("MIRAHOOK_HCBT_MOVESIZE_MSG-9952D68C-
60F8-4a9f-B83F-2A9E855E40A5")
```

The four messages above indicate the window events for selecting an item of a system menu, minimizing window, restoring window and moving menu respectively. When the processing unit 210 initiates the thread of the hook DLL 533, the four predefined messages are registered to the OS 330, where the exemplary code is shown below:

```
MIRAHOOK_WM_MENUITEM=RegisterWindowMessage-
    (MIRAHOOK_WM_MENUITEM_MSG);
MIRAHOOK_HCBT_MOVESIZE=RegisterWindowMessage-
    (MIRAHOOK_HCBT_MOVESIZE_MSG);
MIRAHOOK_WM_MIN=RegisterWindowMessage-
    (MIRAHOOK_WM_MIN_MSG);
MIRAHOOK_WM_RESTORE=RegisterWindowMessage-
    (MIRAHOOK_WM_RESTORE_MSG);
```

When the processing unit 210 initiates the thread of the screen-sharing source application 531, the four predefined messages are registered to the OS 330, where the exemplary code is shown below:

```
static UINT
MIRAHOOK_WM_MENUITEM=::RegisterWindowMessage-
    (MIRAHOOK_WM_MENUITEM_MSG);
static UINT
MIRAHOOK_HCBT_MOVESIZE=::RegisterWindowMessage-
    (MIRAHOOK_HCBT_MOVESIZE_MSG);
static UINT
MIRAHOOK_WM_MIN=::RegisterWindowMessage-
    (MIRAHOOK_WM_MIN_MSG);
static UINT
MIRAHOOK_WM_RESTORE=::RegisterWindowMessage-
    (MIRAHOOK_WM_RESTORE_MSG);
```

Figure 6:
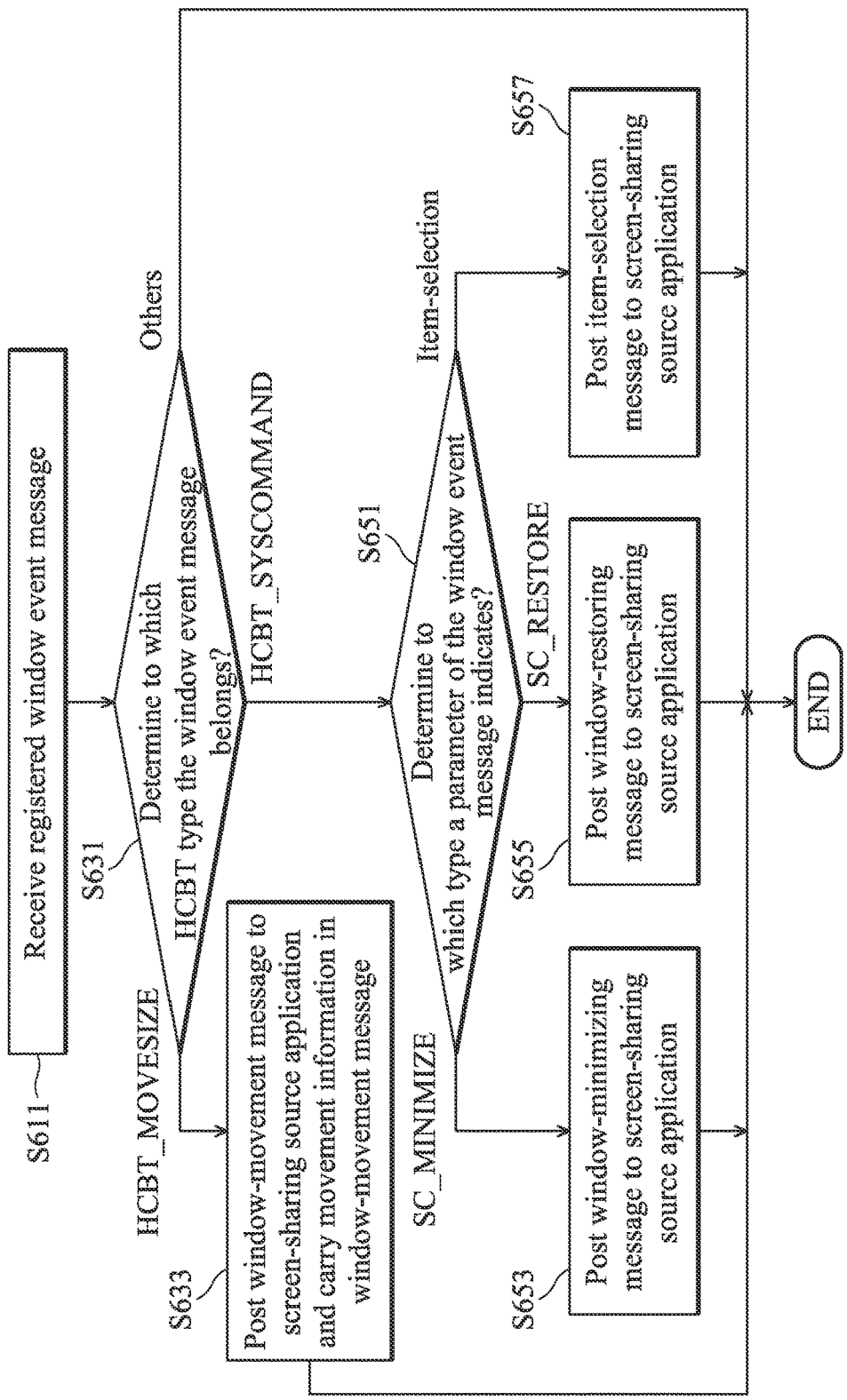
FIG. 6 is a flowchart illustrating a method for dispatching window event messages, performed by a processing unit of a desktop computer 130, according to an embodiment of the invention.

FIG. 6 is a flowchart illustrating a method for dispatching window event messages, performed by the processing unit 210 of the desktop computer 130, according to an embodiment of the invention. The method is performed when the processing unit 210 executes a thread of the hook DLL 533. After a registered window event message has been received (step S611), it is determined to which HCBT type the window event message belongs (step S631). If the window event message is the type of "HCBT_MOVESIZE", then a window-movement message "MIRAHOOK_HCBT_MOVESIZE_MSG" is posted to the screen-sharing source application 531, and movement information is carried in the window-movement message, such as a start position of the window, a width and a height after movement, etc. (step S633). If the window event message is the type of "HCBT_SYSCOMMAND", then it is further determined to which type a parameter of the window event message indicates (step S651). If the parameter indicates the window-minimizing type "SC_MINIMIZE", then a window-minimizing message "MIRAHOOK_WM_MIN_MSG" is posted to the screen-sharing source application 531 (step S653). If the parameter indicates the window-restoring type "SC_RESTORE", then a window-restoring message "MIRAHOOK_WM_RESTORE_MSG" is posted to the screen-sharing source application 531 (step S655). If the parameter contains an aforementioned identify code of an appended item, that is, the window event message is related to an item selection, then an item-selection message "MIRAHOOK_WM_MENUITEM_MSG" is posted to the screen-sharing source application 531, and the contained identify code is carried in the item-selection message (step S657). It should be noted that the hook DLL 533 is employed to deliver the monitored window event messages quickly without the complicated computations of screen-sharing.

Figure 7A:
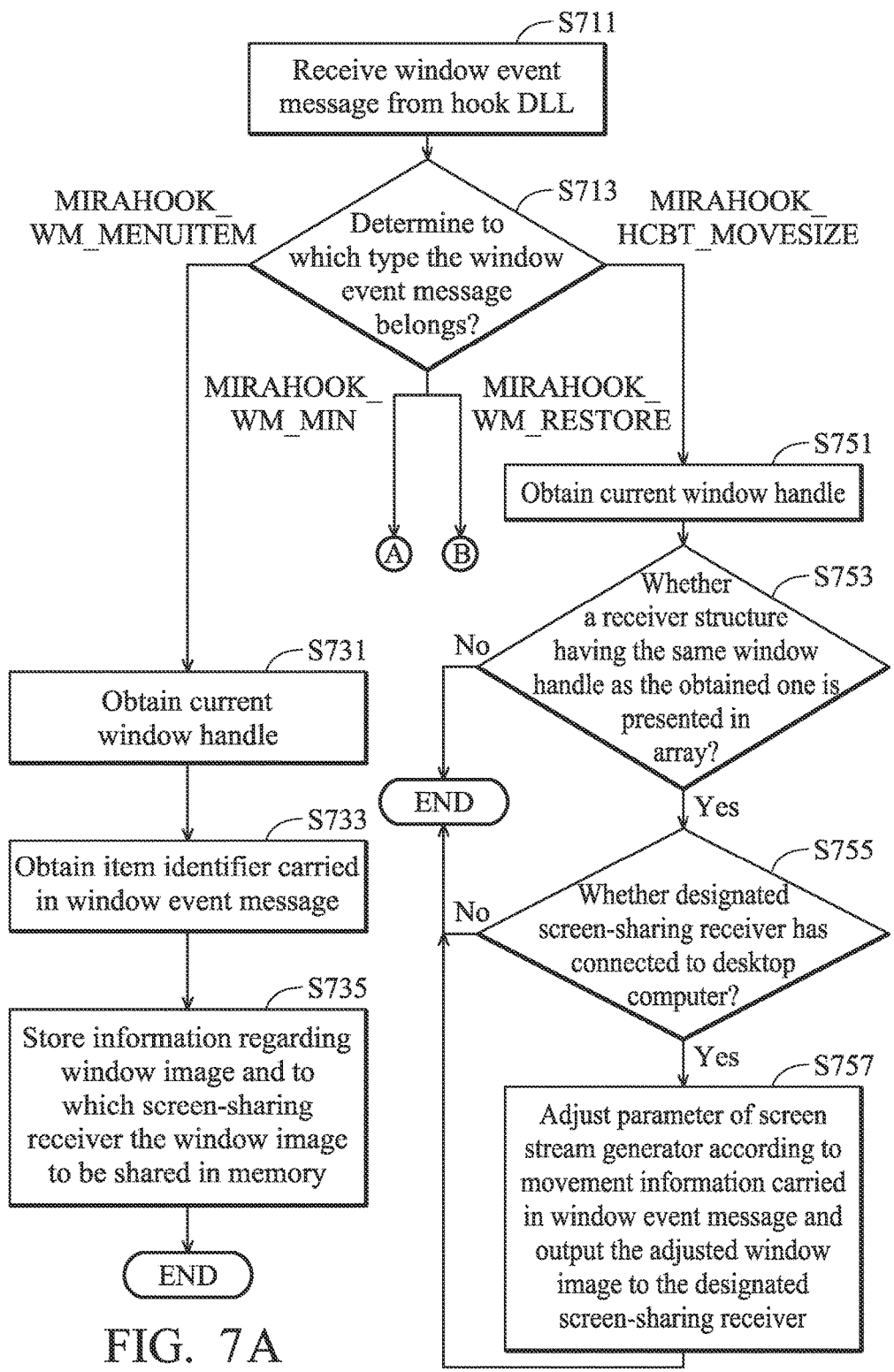
FIGS. 7A and 7B are flowcharts illustrating a method for screen-sharing, performed by a processing unit of a desktop computer, according to an embodiment of the invention.
Figure 7B:
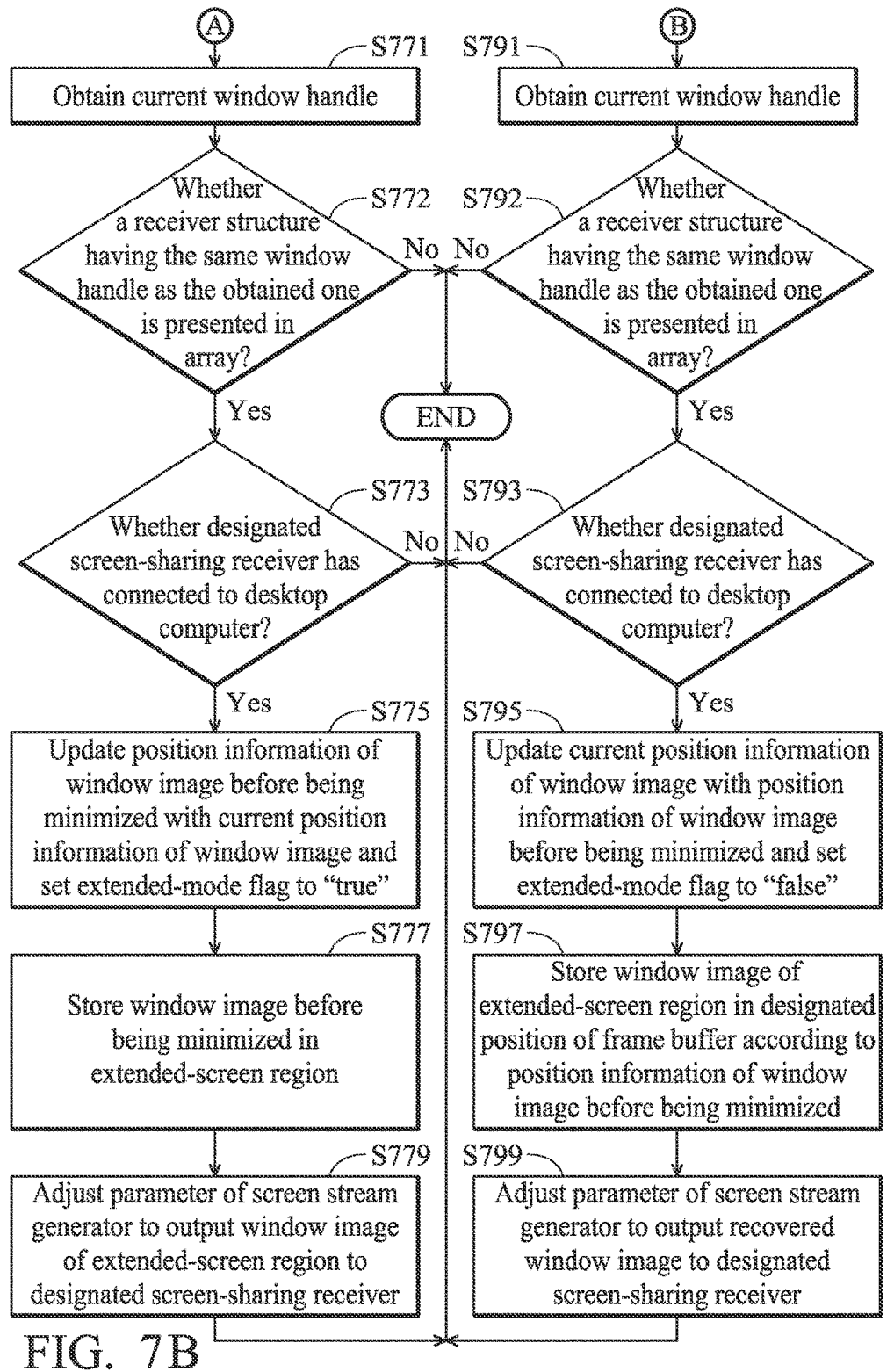

FIGS. 7A and 7B are flowcharts illustrating a method for screen-sharing, performed by the processing unit 210 of the desktop computer 130, according to an embodiment of the invention. The method is performed when the processing unit 210 executes a thread of the screen-sharing source application 531. After a window event message is received from the hook DLL 533 (step S711), it is determined to which type the window event message belongs (step S713). If the window event message belongs to the "MIRAHOOK_WM_MENUITEM" type, then the current window handle is obtained (step S731); an item identify code carried in the window event message is obtained (step S733); and information regarding the window image and to which screen-sharing receiver the window image is to be shared are stored in the memory 250 (step S735). In step S731, the window handle of the application running in the foreground may be obtained by using an API of "GetForegroundWindow". In step S733, the obtained item identify code may be the identify code of the item 410i, 410j, 430f or 430g. In step S735, the information regarding the window image and to which screen-sharing receiver the window image is to be shared may be stored in an array of the receiver structure "Sink" shown as follows:

```
struct Sink
{
CWnd *m_pCWnd;
int m_iX;
int m_iY;
int m_iWidth;
int m_iHeight;
int m_iOldX;
int m_iOldY;
int m_iOldW;
int m_iOldH;
BOOL m_bIsEXD;
};
```

Each receiver structure of the array corresponds to a screen-sharing receiver. For example, Sink[0] stores screen-sharing information for the mobile phone 110; and Sink[1] stores screen-sharing information for the mobile phone 120. A variable "*m_pCWnd" records an address pointing to the current window handle. Variables "m_iX", "m_iY", "m_iWidth" and "m_iHeight" record a start coordinate (i.e. the coordinate of the upper-left corner), a width and a height of the current screen display to be shared to the mobile phone 110 or 120. Variables "m_iOldX", "m_iOldY", "m_iOldW" and "m_iOldH" record a start coordinate (i.e. the coordinate of the upper-left corner), a width and a height of a screen display before being minimized. The variable "m_bIsEXD" is a Boolean value, also referred to as an extended-mode flag, to indicate whether the application is operated under an extended-mode. The receiver structure array is used to provide the mappings between application windows and screen-sharing receivers connected to a screen-sharing source.

Figure 8:
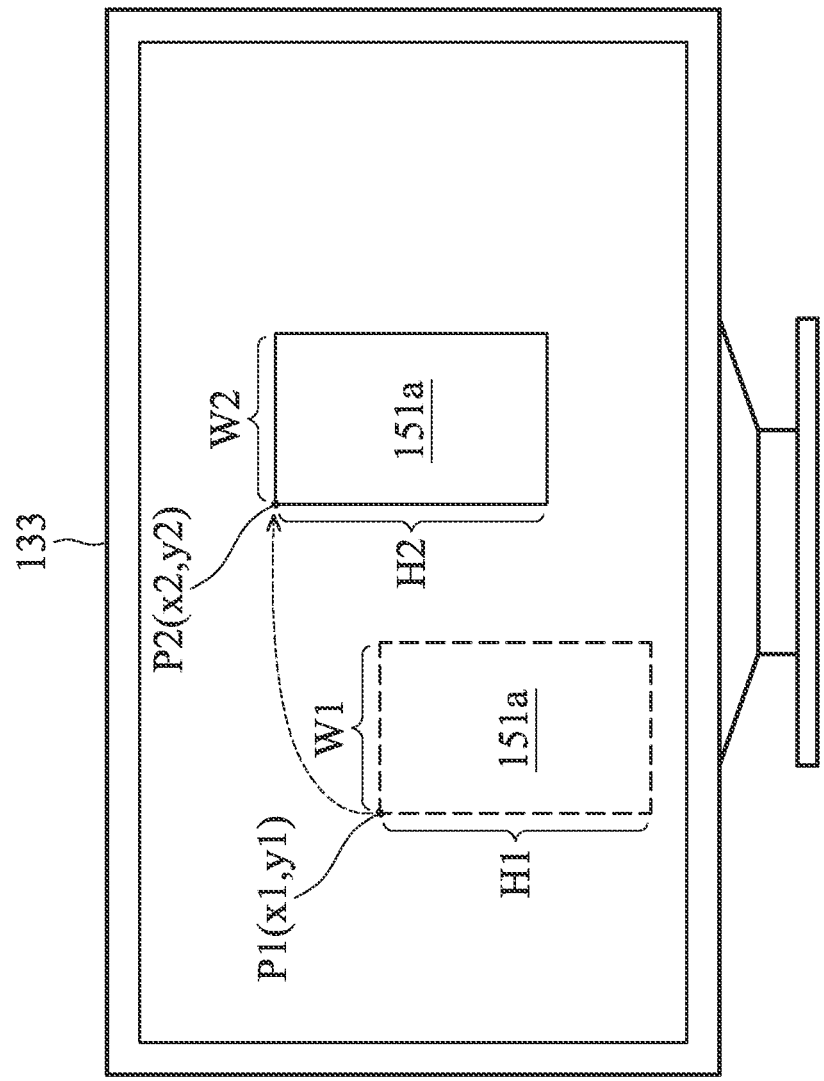
FIG. 8 is a schematic diagram of a window movement according to an embodiment of the invention.

If the window event message belongs to the window-movement "MIRAHOOK_HCBT_MOVESIZE" type, then the current window handle is obtained (step S751); and it is determined whether a receiver structure having the same window handle as the one obtained is presented in the array (step S753). If so, it is further determined whether the designated screen-sharing receiver has connected to the desktop computer 130 (step S755); otherwise, the whole process ends. If the designated screen-sharing receiver has connected to the desktop computer 130 (the "yes" path of step S755), then a parameter of a screen stream generator 539 is adjusted according to the movement information carried in the window event message and the adjusted window image is output to the designated screen-sharing receiver (step S757); otherwise, the whole process ends. In step S751, the window handle of the application running in the foreground may be obtained by using the API "GetForegroundWindow". In step S753, the aforementioned determination may be achieved by comparing the address of the obtained window handle with the address of the window handle stored in each receiver structure. FIG. 8 is a schematic diagram of a window movement according to an embodiment of the invention. Assume that the browser window 151a is configured to be shared to the mobile phone 110 and a start coordinate, a width and a height of the initial window image 151a are P1($x_1$,$y_1$), W1 and H1 respectively: In step S757, the screen-sharing source application 531 adjusts a parameter of the screen stream generator 539 according to a start coordinate P2($x_2$,$y_2$), a width W2 and a height H2 of the window image 151a after being moved, which are carried in the window event message, thereby enabling the screen stream generator 539 to capture image data of a width W2 and a height H2 from the start coordinate P2($x_2$,$y_2$) of the frame buffer as the window image 151a and output the captured window image 151a to the mobile phone 110. That is, no matter where the window screen 151a moves, the screen stream generator 539 can capture the correct image data according to the movement information. Moreover, in step S757, the screen-sharing source application 531 updates the variables "m_iX", "m_iY", "m_iWidth" and "m_iHeight" with $x_2$, $y_2$, W2 and H2 to reflect a movement outcome by a user.

Figure 9:
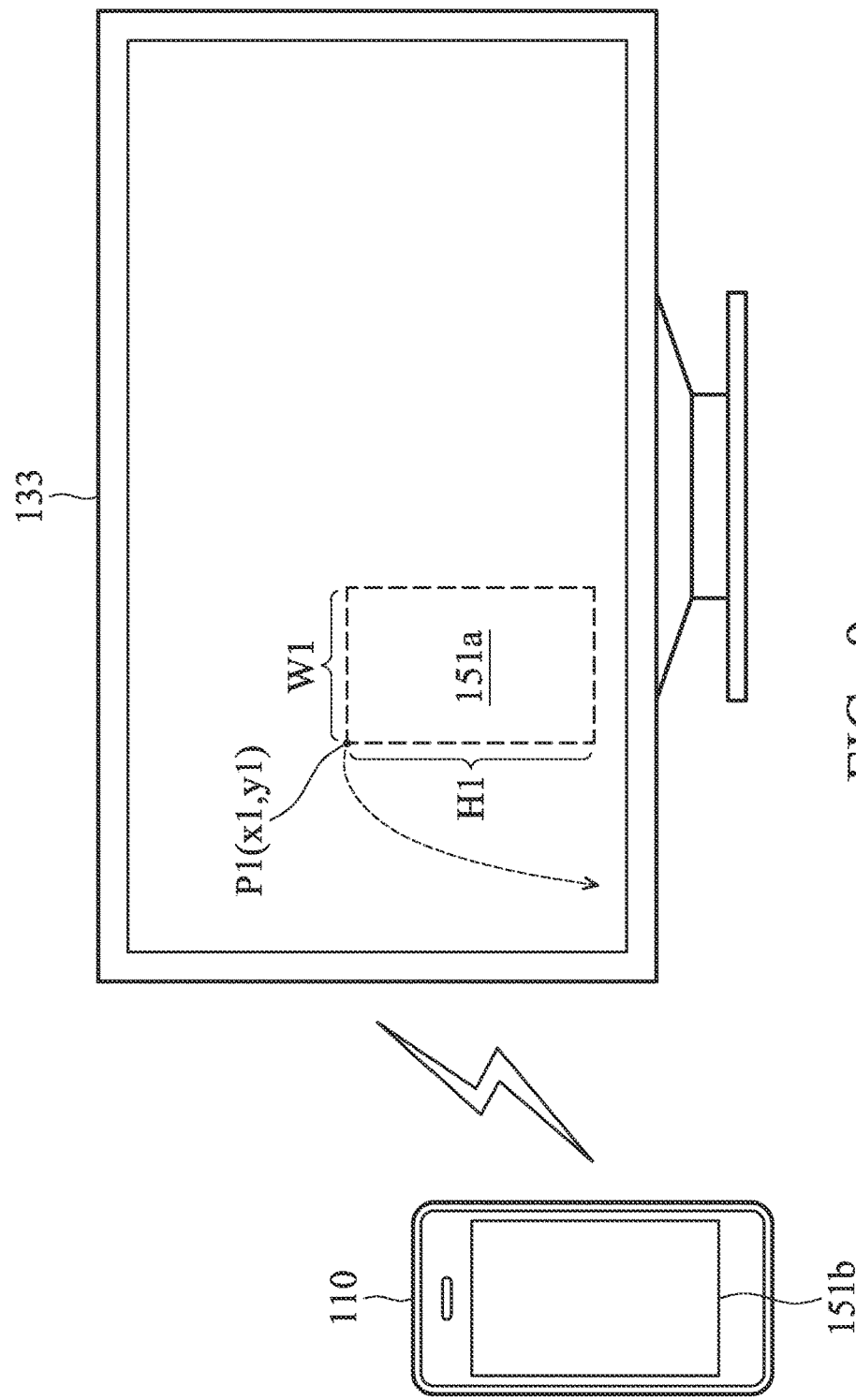
FIG. 9 is a schematic diagram of a window minimizing according to an embodiment of the invention.

If the window event message belongs to the window-minimizing "MIRAHOOK_WM_MIN" type, then the current window handle is obtained (step S771); and it is determined whether a receiver structure having the same window handle as the obtained one is presented in the array (step S772). If so, it is further determined whether the designated screen-sharing receiver has connected to the desktop computer 130 (step S773); otherwise, the whole process ends. If the designated screen-sharing receiver has connected to the desktop computer 130 (the "yes" path of step S773), then, in the receiver structure, the position information of a window image before being minimized is updated with the current position information of the window image and the extended-mode flag is set to "true" (step S775), the window image before being minimized is stored in an extended-screen region (step S777), and a parameter of a screen stream generator 539 is adjusted to output the window image of the extended-screen region to the designated screen-sharing receiver (step S779); otherwise, the whole process ends. Technical details of steps S771, S772 and S773 may be referred to in the description of steps S751, S753 and S755 respectively. In step S775, specifically, the screen-sharing source application 531 updates the variables "m_iOldX", "m_iOldY", "m_iOldW" and "m_iOldH" of the receiver structure with the variables "m_iX", "m_iY", "m_iWidth" and "m_iHeight" of the receiver structure, clears the variables "m_iX", "m_iY", "m_iWidth" and "m_iHeight" of the receiver structure if required, and sets the variable "m_bIsEXD" to "true". In step S777, the extended-screen region may be a designated region of the frame buffer or the memory 250. FIG. 9 is a schematic diagram of a window minimizing according to an embodiment of the invention. Assume that the browser window 151a is configured to be shared to the mobile phone 110 and a start coordinate, a width and a height of the initial window image 151a are P1($x_1,y_1$), W1 and H1 respectively: In step S779, the screen-sharing source application 531 adjusts a parameter of the screen stream generator 539 to output the window image 151a from the extended-screen region (instead of the frame buffer) to the mobile phone 110, thereby enabling the mobile phone 110 to display the window image 151b although the window image 151a is not displayed on the display device 133.

Figure 10:
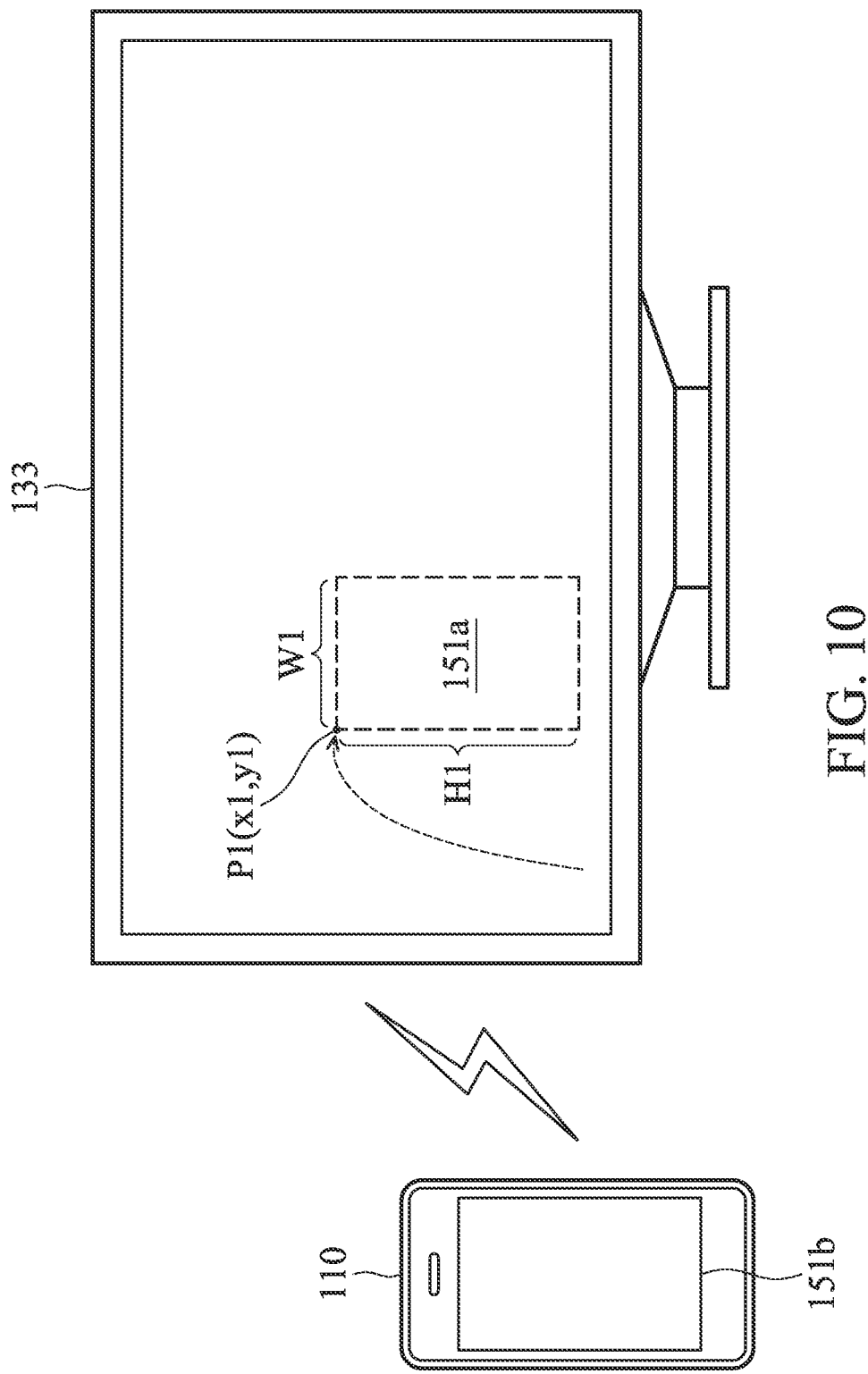
FIG. 10 is a schematic diagram of a window recovery according to an embodiment of the invention.

If the window event message belongs to the window-restoring "MIRAHOOK_WM_RESTORE" type, then the current window handle is obtained (step S791); and it is determined whether a receiver structure having the same window handle as the obtained one is presented in the array (step S792). If so, it is further determined whether the designated screen-sharing receiver has connected to the desktop computer 130 (step S793); otherwise, the whole process ends. If the designated screen-sharing receiver has connected to the desktop computer 130 (the "yes" path of step S793), then, in the receiver structure, the current position information of a window image is updated with the position information of the window image before being minimized and the extended-mode flag is set to "false" (step S795), a window image of the extended-screen region is stored in a designated position of the frame buffer according to the position information of the window image before being minimized (step S797), and a parameter of a screen stream generator 539 is adjusted to output the recovered window image to the designated screen-sharing receiver (step S799); otherwise, the whole process ends. Technical details of steps S791, S792 and S793 may refer to the description of steps S751, S753 and S755 respectively. In step S795, specifically, the screen-sharing source application 531 updates the variables "m_iX", "m_iY", "m_iWidth" and "m_iHeight" of the receiver structure with the variables "m_iOldX", "m_iOldY", "m_iOldW" and "m_iOldH" of the receiver structure, clears the variables "m_iOldX", "m_iOldY", "m_iOldW" and "m_iOldH" of the receiver structure if required, and sets the variable "m_bIsEXD" as "false". FIG. 10 is a schematic diagram of a window recovery according to an embodiment of the invention. Assume that the browser window 151a is configured to be shared to the mobile phone 110 and a start coordinate, a width and a height of the window image 151a before being minimized are P1 ($x_1,y_1$), W1 and H1 respectively: In step S799, the screen-sharing source application 531 adjusts a parameter of the screen stream generator 539 to capture image data of a width W1 and a height H1 from a coordinate P1($x_1,y_1$) of the frame buffer as the window image 151a and outputs the captured window image 151a to the mobile phone 110.

Refer back to FIG. 5. When executing a thread of the screen-sharing receiver application 551, the processing unit 210 of the mobile phone 110 or 120 sends the window image from the desktop computer 130 to a decoder 553. An image renderer 555 renders the decoding results on the display unit 220 of the mobile phone 110 or 120. The exemplary rendering results may refer to that displayed on the display units 151b and 153b as shown in FIG. 1.

Although the embodiment has been described as having specific elements in FIG. 2, it should be noted that additional elements may be included to achieve better performance without departing from the spirit of the invention. While the process flows described in FIGS. 3, 6, 7A and 7B each include a number of operations that appear to occur in a specific order, it should be apparent that these processes can include more or fewer operations, which can be executed in series or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A screen-sharing method, performed by a processing unit of a screen-sharing source, comprising:
obtaining a plurality of application windows being opened on a display unit; and
in response that each application window being opened is detected by an OS (Operating System), a callback function is called to obtain a system menu instance comprising a plurality of predefined items of each opened application window, detect a plurality of screen-sharing receivers, which are connected to the screen-sharing source, and append a plurality of customized items to the system menu instance of each opened application window, wherein after appending the customized items, the system menu instance of each opened application window comprises the customized items and the predefined items; and
performing a detection loop repeatedly, until no screen-sharing receiver is detected when executing the callback function;
wherein each customized item corresponds to one screen-sharing receiver;
wherein in the step for obtaining the plurality of application windows being opened on the display unit, further comprises:
obtaining the application windows being opened on the display unit and registering the callback function to the OS by using a window-enumerating function;
wherein the callback function selects one of identify codes, which corresponds to a detected screen-sharing receiver, and the same identify code is assigned to the customized items of different enumerated windows when the customized items are used to share different application windows to the same screen-sharing receiver;
wherein in response to the customized items is clicked, an application corresponding to the application windows sends a message with a corresponding identify code to the operation system.

2. The screen-sharing method of claim 1, wherein when one customized item is selected, sending a window image of the application window to the corresponding screen-sharing receiver.

3. A screen-sharing method, performed by a processing unit of a screen-sharing source, comprising:
  providing a plurality of mappings between a plurality of application windows and a plurality of screen-sharing receivers connecting to the screen-sharing source based on a plurality of receiver structures corresponding to the screen-sharing receivers;
  obtaining a window event message and a current window handle of one application window;
  determining whether the corresponding one of the receiver structures having a same window handle with the current window handle;
  determining one screen-sharing receiver corresponding to the window event message according to the mappings;
  capturing a window image of the application window according to the obtained window event message and a coordinate information recited in a corresponding one of the receiver structures, wherein the coordinate information varies based on the window event message; and
  outputting the captured window image of the application window to the determined screen-sharing receiver;
  wherein in response to the window event message belongs to a window-minimizing type, a screen-sharing source application adjusts a parameter of a screen stream generator to output the window image of the application window from an extended-screen region to the determined screen-sharing receiver;
  wherein the corresponding one of the receiver structures comprises an extended-mode flag, a current position information, a position information of a window image before being minimized;
  wherein the position information of the window image before being minimized is updated with the current position information of the window image and the extended-mode flag is set to "true", and the window image is not displayed on the screen-sharing source.

4. The screen-sharing method of claim 3, wherein, in the step of capturing the window image of the application window according to the coordinate information and the obtained window event message, further comprises:
  when the obtained window event message belongs to a window-movement type, capturing image data of a width and a height from a start coordinate of a frame buffer as the window image of the application window according to the start coordinate, the width and the height of the application window after being moved carried in the window event message.

5. The screen-sharing method of claim 3, wherein, in the step of capturing the window image of the application window according to the coordinate information and the obtained window event message, further comprises:
  when the obtained window event message belongs to the window-minimizing type, storing the window image of the application window before being minimized in the extended-screen region and capturing image data of the extended-screen region as the window image of the application window.

6. The screen-sharing method of claim 5, wherein the window image of the application window stored in the extended-screen region is not displayed on a display unit of the screen-sharing source.

7. The screen-sharing method of claim 3, wherein, in the step of capturing the window image of the application window according to the coordinate information and the obtained window event message, further comprises:
  when the obtained window event message belongs to a window-restoring type, obtaining a start coordinate, a width and a height of the window image of the application window before being minimized, storing image data of the extended-screen region in a region of the width and the height from the start coordinate of a frame buffer, and capturing the image data of the region as the window image of the application window.

8. The screen-sharing method of claim 3, further comprising:
  obtaining the application windows being opened on a display unit; and
  for each application window, detecting the screen-sharing receivers, which are connected to the screen-sharing source, and appending a plurality of items to a system menu instance of each application window,
  wherein each item corresponds to one screen-sharing receiver.

9. A screen-sharing apparatus, operating as a screen-sharing source, comprising:
  a display unit; and
  a processing unit, coupled to the display unit, obtaining a plurality of application windows being opened on the display unit; and in response that each application window being opened is detected by an OS (Operating System), a callback function is called to obtain a system menu instance comprising a plurality of predefined items of each opened application window, detect a plurality of screen-sharing receivers, which are connected to the screen-sharing source, and append a plurality of customized items to the system menu instance of each opened application window; wherein after appending the customized items, the system menu instance of each opened application window comprises the customized items and the predefined items; and when executing the callback function, the processing unit performs a detection loop repeatedly until no screen-sharing receiver is detected; wherein each customized item corresponds to one screen-sharing receiver,
  wherein the processing unit obtains the application windows being opened on the display unit and registers the callback function to the OS by using a window-enumerating function when executing a system program thread for activating a screen-sharing function;
  wherein the callback function selects one of identify codes, which corresponds to a detected screen-sharing receiver, and the same identify code is assigned to the customized items of different enumerated windows when the customized items are used to share different application windows to the same screen-sharing receiver;
  wherein in response to the customized items is clicked, an application corresponding to the application windows sends a message with a corresponding identify code to the operation system.

10. The screen-sharing apparatus of claim 9, wherein when one customized item is selected, the processing unit sends a window image of the application window to the corresponding screen-sharing receiver.

11. A screen-sharing apparatus, operating as a screen-sharing source, comprising:
  a display unit; and
  a processing unit, coupled to the display unit, providing a plurality of mappings between a plurality of application windows and a plurality of screen-sharing receivers connecting to the screen-sharing source based on a plurality of receiver structures corresponding to the screen-sharing receivers; obtaining a window event message and a current window handle of one application window; determining whether the corresponding one of the receiver structures having a same window handle with the current window handle; determining one screen-sharing receiver corresponding to the window event message according to the mappings; capturing a window image of the application window according to the obtained window event message and a coordinate information recited in a corresponding one of the receiver structures, and outputting the captured window image of the application window to the determined screen-sharing receiver, wherein the coordinate information varies based on the window event message;

wherein in response to the window event message belongs to a window-minimizing type, a screen-sharing source application adjusts a parameter of a screen stream generator to output the window image of the application window from an extended-screen region to the determined screen-sharing receiver;

wherein the corresponding one of the receiver structures comprises a extended-mode flag, a current position information, the position information of a window image before being minimized, the position information of a window image before being minimized is updated with the current position information of the window image and the extended-mode flag is set to "true", and the window image is not displayed on the display unit.

12. The screen-sharing apparatus of claim 11, wherein when the obtained window event message belongs to a window-movement type, the processing unit captures image data of a width and a height from a start coordinate of a frame buffer as the window image of the application window according to the start coordinate, the width and the height of the application window after being moved carried in the window event message.

13. The screen-sharing apparatus of claim 11, wherein when the obtained window event message belongs to the window-minimizing type, the processing unit stores the window image of the application window before being minimized in the extended-screen region and captures image data of the extended-screen region as the window image of the application window.

14. The screen-sharing apparatus of claim 13, wherein the window image of the application window stored in the extended-screen region is not displayed on a display unit of the screen-sharing source.

15. The screen-sharing apparatus of claim 11, wherein when the obtained window event message belongs to a window-restoring type, the processing unit obtains a start coordinate, a width and a height of the window image of the application window before being minimized, stores image data of the extended-screen region in a region of the width and the height from the start coordinate of a frame buffer, and captures the image data of the region as the window image of the application window.

16. The screen-sharing apparatus of claim 11, wherein the processing unit obtains the application windows being opened on the display unit; and for each application window, detects the screen-sharing receivers, which are connected to the screen-sharing source, and appending a plurality of items to a system menu instance of each application window, wherein each item corresponds to one screen-sharing receiver.

* * * * *